United States Patent [19]

Cetinkaya

[11] Patent Number: 5,449,497
[45] Date of Patent: Sep. 12, 1995

[54] PLUG FLOW VENTED RISER

[75] Inventor: Ismail B. Cetinkaya, Palatine, Ill.

[73] Assignee: UOP, Des Plaines, Ill.

[21] Appl. No.: 236,944

[22] Filed: May 2, 1994

Related U.S. Application Data

[62] Division of Ser. No. 952,124, Sep. 28, 1992, Pat. No. 5,308,474.

[51] Int. Cl.⁶ .................. F27B 15/08; C10G 11/00; B01J 20/34
[52] U.S. Cl. .................. 422/144; 422/145; 422/147; 208/113; 208/161; 502/44
[58] Field of Search .............. 422/144, 145, 146, 147; 122/4 D; 208/161, 151, 113; 502/44

[56] References Cited

U.S. PATENT DOCUMENTS

| | | | |
|---|---|---|---|
| 4,219,407 | 8/1980 | Haddad et al. | 208/151 |
| 4,295,961 | 10/1981 | Fahrig et al. | 208/161 |
| 4,364,905 | 12/1982 | Fahrig et al. | 422/144 |
| 4,394,349 | 7/1983 | Cartmell | 422/147 |
| 4,495,063 | 1/1985 | Walters et al. | 208/161 |
| 4,588,558 | 5/1986 | Kam et al. | 422/113 |
| 4,721,603 | 1/1988 | Krug et al. | 208/161 |
| 4,786,622 | 11/1988 | Walters et al. | 502/44 |
| 4,792,437 | 12/1988 | Hettinger, Jr. et al. | 422/147 |
| 5,045,176 | 9/1991 | Walters et al. | 208/161 |
| 5,143,874 | 9/1992 | Ross | 502/42 |
| 5,215,720 | 6/1993 | Cetinkaya | 422/144 |

Primary Examiner—Robert J. Warden
Assistant Examiner—Christopher Y. Kim
Attorney, Agent, or Firm—Thomas K. McBride; John G. Tolomei

[57] ABSTRACT

An FCC reactor achieves greater utilization of the space within the reactor vessel by using a vented riser arrangement having an inlet opening at the bottom of a vented riser collector. The inlet opening at the bottom of the vented riser collector allows plug flow of the catalyst and hydrocarbon vapors through the upper and lower section of the reactor vessel without any substantial degradation and separation efficiency between the catalyst and the hydrocarbon vapors. This permits almost the entire tangent length of the reactor vessel to be used for the purpose of catalyst and hydrocarbon contact.

5 Claims, 3 Drawing Sheets 5,449,497

PLUG FLOW VENTED RISER

CROSS-REFERENCE TO RELATED APPLICATION

This application is a divisional of U.S. Ser. No. 07/952,124, filed Sep. 28, 1992 and issued as U.S. Pat. No. 5,308,474, the contents of which are hereby incorporated by reference.

FIELD OF THE INVENTION

This invention relates generally to apparatus for the fluidized catalytic cracking (FCC) of heavy hydrocarbon streams such as vacuum gas oil and reduced crudes. This invention relates more specifically to an apparatus for reacting hydrocarbons in an FCC reactor and separating reaction products from the catalyst used therein.

BACKGROUND OF THE INVENTION

The fluidized catalytic cracking of hydrocarbons is the main stay process for the production of gasoline and light hydrocarbon products from heavy hydrocarbon charge stocks such as vacuum gas oils or residual feeds. Large hydrocarbon molecules, associated with the heavy hydrocarbon feed, are cracked to break the large hydrocarbon chains thereby producing lighter hydrocarbons. These lighter hydrocarbons are recovered as product and can be used directly or further processed to raise the octane barrel yield relative to the heavy hydrocarbon feed.

The basic equipment or apparatus for the fluidized catalytic cracking of hydrocarbons has been in existence since the early 1940's. The basic components of the FCC process include a reactor, a regenerator and a stripper. The reactor includes a contact zone where the hydrocarbon feed is contacted with a particulate catalyst and a separation zone where product vapors from the cracking reaction are separated from the catalyst. Further product separation takes place in a catalyst stripper that receives catalyst from the separation zone and removes entrained hydrocarbons from the catalyst by counter-current contact with steam or another stripping medium. The FCC process is carried out by contacting the starting material whether it be vacuum gas oil, reduced crude, or another source of relatively high boiling hydrocarbons with a catalyst made up of a finely divided or particulate solid material. The catalyst is transported like a fluid by passing gas or vapor through it at sufficient velocity to produce a desired regime of fluid transport. Contact of the oil with the fluidized material catalyzes the cracking reaction. During the cracking reaction, coke will be deposited on the catalyst. Coke is comprised of hydrogen and carbon and can include other materials in trace quantities such as sulfur and metals that enter the process with the starting material. Coke interferes with the catalytic activity of the catalyst by blocking active sites on the catalyst surface where the cracking reactions take place. Catalyst is traditionally transferred from the stripper to a regenerator for purposes of removing the coke by oxidation with an oxygen-containing gas. An inventory of catalyst having a reduced coke content, relative to the catalyst in the stripper, hereinafter referred to as regenerated catalyst, is collected for return to the reaction zone. Oxidizing the coke from the catalyst surface releases a large amount of heat, a portion of which escapes the regenerator with gaseous products of coke oxidation generally referred to a flue gas. The balance of the heat leaves the regenerator with the regenerated catalyst. The fluidized catalyst is continuously circulated from the reaction zone to the regeneration zone and then again to the reaction zone. The fluidized catalyst, as well as providing a catalytic function, acts as a vehicle for the transfer of heat from zone to zone. Catalyst exiting the reaction zone is spoken of as being spent, i.e., partially deactivated by the deposition of coke upon the catalyst. Specific details of the various contact zones, regeneration zones, and stripping zones along with arrangements for conveying the catalyst between the various zones are well known to those skilled in the art.

The rate of conversion of the feedstock within the reaction zone is controlled by regulation of the temperature of the catalyst, activity of the catalyst, quantity of the catalyst (i.e., catalyst to oil ratio) and contact time between the catalyst and feedstock. The most common method of regulating the reaction temperature is by regulating the rate of circulation of catalyst from the regeneration zone to the reaction zone which simultaneously produces a variation in the catalyst to oil ratio as the reaction temperature change. That is, if it is desired to increase the conversion rate, an increase in the rate of flow of circulating fluid catalyst from the regenerator to the reactor is effected.

The hydrocarbon product of the FCC reaction is recovered in vapor form and transferred to product recovery facilities. These facilities normally comprise a main column for cooling the hydrocarbon vapor from the reactor and recovering a series of heavy cracked products which usually include bottom materials, cycle oil, and heavy gasoline. Lighter materials from the main column enter a concentration section for further separation into additional product streams.

One improvement to FCC units, that has reduced the product loss by thermal cycle cracking, is the use of riser cracking. In riser cracking, regenerated catalyst and starting materials enter a pipe reactor and are transported upward by the expansion of the gases that result from the vaporization of the hydrocarbons, and other fluidizing mediums if present, upon contact with the hot catalyst. Riser cracking provides good initial catalyst and oil contact and also allows the time of contact between the catalyst and oil to be more closely controlled by eliminating turbulence and backmixing that can vary the catalyst residence time. An average riser cracking zone today will have a catalyst to oil contact time of 1 to 5 seconds. A number of riser designs use a lift gas as a further means of providing a uniform catalyst flow. Lift gas is used to accelerate catalyst in a first section of the riser before introduction of the feed and thereby reduce the turbulence which can vary the contact time between the catalyst and hydrocarbons.

Riser cracking whether with or without the use of lift gas has provided substantial benefits to the operation of the FCC unit. These can be summarized as a short contact time in the reactor riser to control the degree of cracking that takes place in the riser and improved mixing to give a more homogeneous mixture of catalyst and feed. A more complete distribution of feed in the catalyst reduces variations in the contact time between the catalyst and feed over the cross-section of the riser which would otherwise cause some portions of the feed to contact the catalyst for a longer time than other portions of the feed. Both the short contact time and a more uniform average contact time for all of the feed with the catalyst has allowed overcracking to be controlled or eliminated in the reactor riser.

Unfortunately, much of what can be accomplished in the reactor riser in terms of uniformity of feed contact and controlled contact time can be lost when the catalyst is separated from the hydrocarbon vapors. As the catalyst and hydrocarbons are discharged from the riser, they must be separated. In early riser cracking operations, the output from the riser was discharged into a large vessel. This vessel serves as a disengaging chamber and is still referred to as a reactor vessel, although most of the reaction takes place in the reactor riser. The reactor vessel has a large volume. Vapors that enter the reactor vessel are well mixed in the large volume and therefore have a wide residence time distribution that results in relatively long residence times for a significant portion of the product fraction. Product fractions that encounter extended residence times can undergo additional catalytic and thermal cracking to less desirable lower molecular weight products.

One apparatus that has been known to promote quick separation between the catalyst and the vapors in the reactor vessel is known as a ballistic separation device which is also referred to as a vented riser. The structure of the vented riser, in its basic form, consists of a straight portion of conduit at the end of the riser and an upwardly directed annular opening in the form of a manifold or collection cup that surrounds the open end of the riser. Inlets to one or more cyclones withdraw product vapors from the collector cup. The apparatus functions by shooting the high momentum catalyst particles past the open end of the riser where the vapor collection takes place. A quick separation between the catalyst and the vapors occurs due to the relatively low density of the vapor which have little momentum and can quickly change direction to turn and enter the manifold or collection cup while the heavier catalyst particles continue along a straight trajectory from the riser outlet. The vented riser has the advantage of eliminating any dead area in the top of the reactor vessel where coke can form while providing a quick separation between the catalyst and the vapors. However, the vented riser operates with a large open volume in the reactor vessel. This volume remains substantially unused for beneficial catalyst vapor contacting and exposes a small amount of the product vapor to detrimental overcracking. Thus, the vented riser provides good catalyst separation efficiency for a large percentage of the riser vapors by promoting a quick disengagement of catalyst particles from the riser gases, but fails to utilize the large volume of the reactor vessel and promotes overcracking of any vapors retained therein.

BRIEF DESCRIPTION OF THE INVENTION

This invention improves the operation of a vented riser by providing a definable path of cocurrent contacting for the catalyst and vapors exiting a vented riser that at least approximates plug flow conditions. By establishing a definable path of cocurrent contacting this invention effectively utilizes the large interior of the reactor vessel with the surprising advantage of not degrading catalyst separation efficiency. Reduction of turbulence and residence time variation improves product yields. Utilizing more of the reactor vessel interior for vapor catalyst contacting has the advantage of adding catalyst contact time. Increased contact time can permit a reduction in the riser length.

Accordingly, in one embodiment, this invention is an apparatus for the fluidized catalytic cracking of an FCC feedstock. The apparatus includes an upwardly directed riser conduit having an upwardly directed discharge opening. Means for collecting a gaseous component from the reactor vessel at a locus below the discharge opening are provided with the means having a downwardly directed inlet opening that separates catalyst from the gaseous components. Means are provided for removing catalyst from the separation device and a conduit removes gaseous components from the separation device and the reactor vessel Additional objects, embodiments, and details of this invention are disclosed in the following detailed description of the invention.

DETAILED DESCRIPTION OF THE INVENTION

This invention relates generally to the reactor side of the FCC process. This invention will be useful for most FCC processes that are used to crack light or heavy FCC feedstocks. The process and apparatus aspects of this invention can be used to modify the operation and arrangement of existing FCC units or in the design of newly constructed FCC units.

This invention uses the same general elements of many FCC units. A reactor riser provides the primary reaction zone. A reactor vessel and cyclone separators remove catalyst particles from the gaseous product vapors. A stripping zone removes a large percentage of sorbed upon from the surface of the catalyst. Spent catalyst from the stripping zone is regenerated in a regeneration zone having one or more stages of regeneration. Regenerated catalyst from the regeneration zone is used in the reactor riser. A number of different arrangements can be used for the reactor and regenerator sections. The description herein of specific reactor and regenerator components is not meant to limit this invention to those details except as specifically set forth in the claims.

Figure 1:
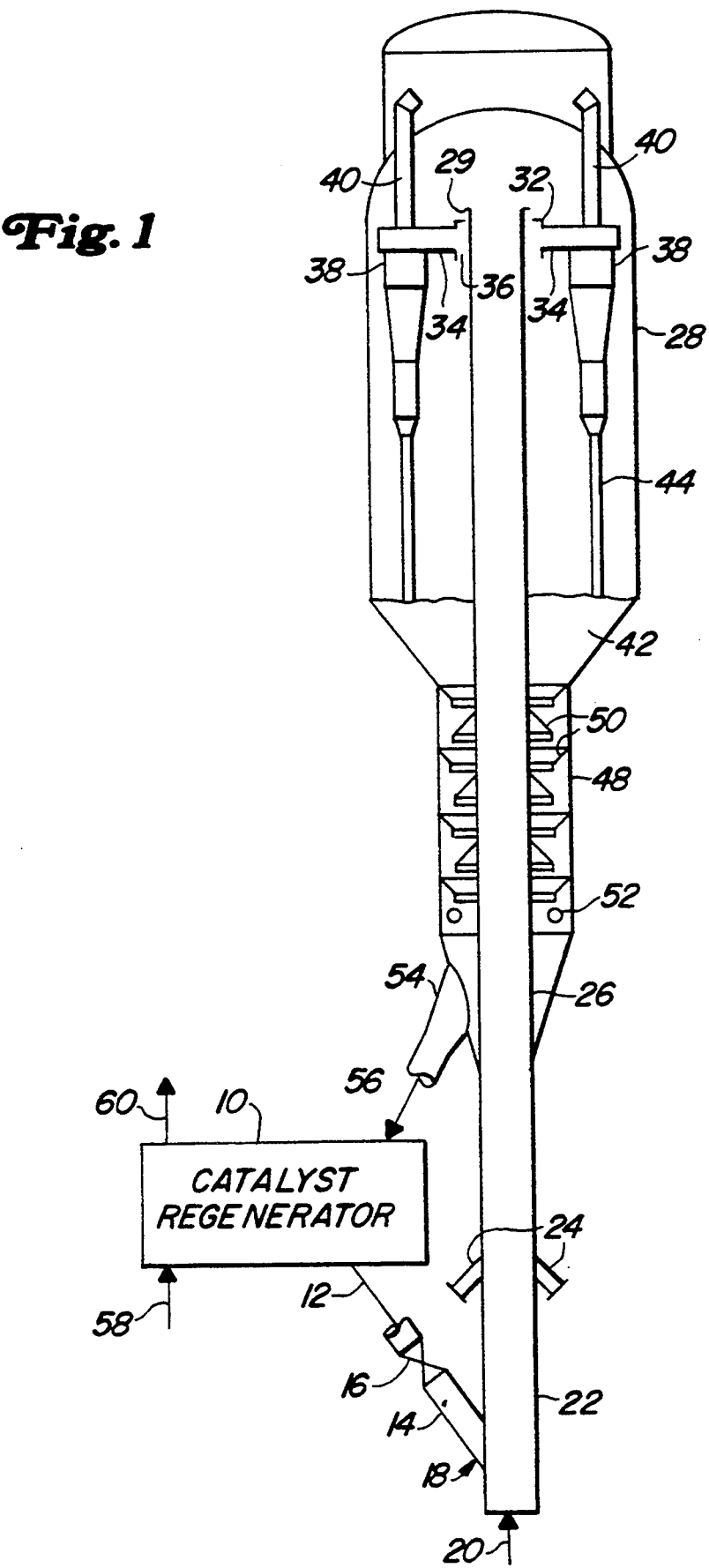
FIG. 1 shows a reactor/regenerator system for an FCC process arranged in accordance with this invention.

An overview of the basic process operation can be best understood with reference to the FIG. 1. Regenerated catalyst from a conduit 12 of a regeneration zone 10 is transferred by a conduit 140 at a rate regulated by a control valve 16, to a Y-section 18. Lift gas injected into the bottom of Y-section 18, by a conduit 20, carries the catalyst upward through a lower riser section 22. Feed is injected into the riser above lower riser section 22 by feed injection nozzles 24. The drawing shows this invention being used with a riser arrangement having a lift gas zone 22. It is not necessary that a lift gas zone be provided in the riser in order to enjoy the benefits of this invention.

The mixture of feed, catalyst and lift gas travels up a second section of the riser 26 that extends into a reactor vessel 28 and together with riser sections 26 and 22 forms the full length of the riser that empties a mixture of catalyst and gaseous components out of the end 29 of the riser. The term "gaseous components" includes lift gas, product gases and vapors, and unconvened feed components.

A collector 32 provides means for removing gaseous components from the reactor and is located at the end of the riser at a locus below the discharge opening of the riser. A pair of outlets 34 connect the collector 32 with cyclone separators 38. The collector 32 has an open bottom 36 that receives gaseous components from the reactor vessel for further separation in the cyclones. Gaseous components are recovered overhead from the cyclones by lines 40 and separated catalyst particles are returned from the cyclones to a dense bed 42 by dip-legs 44.

Spent catalyst, entrained hydrocarbons, and adsorbed hydrocarbons flow downwardly from bed 42 into a stripper 48. As catalyst flows downwardly through stripper 48, it is cascaded back and forth by a series of baffles 50. Steam is injected into a lower portion of the stripper by a distributor 52, and passes upwardly in countercurrent flow to the downwardly cascading stream of catalyst. A nozzle 54 withdraws catalyst from the bottom of the stripping zone 48 and transfers it to the catalyst regenerator 10 by a line 56. An oxygen-containing stream carried by line 58 contacts the catalyst in the regenerator and combusts coke from the catalyst thereby producing a flue gas stream of coke combustion by-products removed from the regenerator by a line 60. Combustion reduces the concentration of coke and provides the regenerated catalyst. Any well-known regenerator arrangement for removing coke from the catalyst particles by the combustion of coke and returning catalyst particles to the reactor riser can be used and the particular details of the regeneration zone are not an important aspect of this invention.

Figure 2:
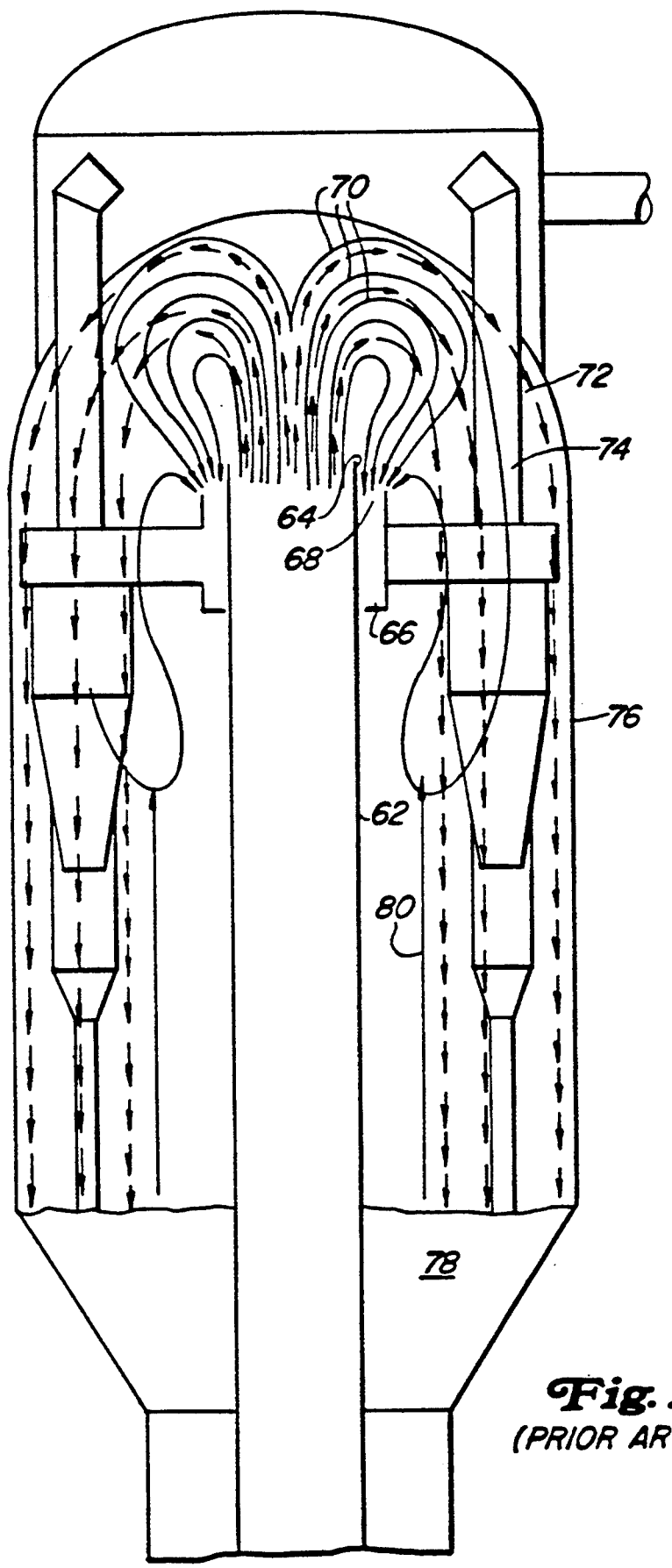
FIG. 2 illustrates the flow distribution of catalyst and gases in an upper portion of a reactor arranged in accordance with the prior art

The riser of this invention, as arranged, provides a unique region of catalyst and gas separation that differs substantially from the prior art. Looking then at the prior an operation of the reactor and upper portion of the riser, FIG. 2 depicts such an arrangement where catalyst travels up a section 62 of a riser in a typical plug flow manner and at a velocity of between 20 to 100 ft/sec with a catalyst density of between 1 to 5 lb/ft$^3$. The relatively uniform upward flow of the catalyst continues until it reaches outlet 64 of the riser from which catalyst particles and gaseous components are discharged. A collector in the form of cup 66 represents the typical prior an arrangement for a vented riser and withdraws gaseous components with small mounts of entrained catalyst through an upwardly directed inlet opening 68. The upwardly directed inlet opening 68 causes the gaseous components to flow in a tightly curved path represented by solid stream lines 70. The quick turn of the gaseous components causes a rapid disengagement of catalyst particles along a path represented by broken flow lines 72. The catalyst continues downward into a catalyst bed 78. The small mount of vapor entrained with the catalyst passing along flow line 72 either changes direction above bed 78 and flows into opening 68, or is disengaged by stripping gas passing out of bed 78 along flow line 80. A small mount of the gaseous components, represented by flow line 74, flow downwardly below the inlet opening into a lower portion of the reactor vessel 76 before exiting the vessel through opening 68. The upper end 64 of the reactor riser 62 resides in an upper portion of reactor vessel 76. The usual locus for riser outlet 64 is at least mid-way up the length of the reactor vessel and more often at the top of the reactor vessel. Since the reactor vessel 76 has a tangent length of at least 30 feet and typically greater than 40 feet, a substantial amount of the vessel length, i.e., that below outlet 64 and above bed 78, goes unused since only a small portion of the hydrocarbon vapor that enters that section of the vessel passes below discharge point 64 where it can continue to react with the catalyst passing therein. In the past it was believed that having continued catalyst contact below the discharge end 64 would cause a loss in product yield due to turbulence and resulting variations in the contact time between the hydrocarbons and the catalyst.

Figure 3:
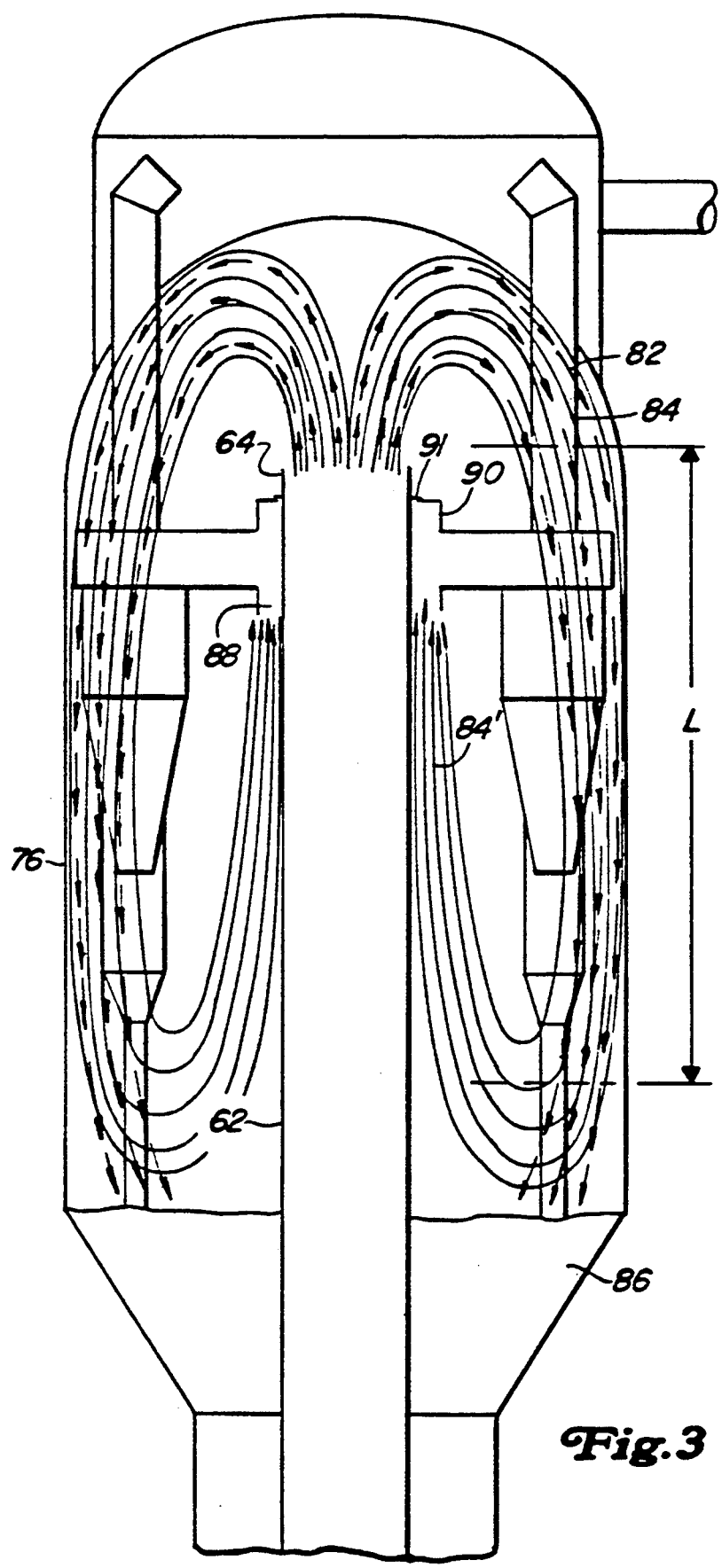
FIG. 3 illustrates the flow distribution of catalyst and gases in an upper portion of a reactor vessel arranged in accordance with this invention.

FIG. 3 demonstrates the operation of the invention wherein it has been discovered that catalyst contact can be maintained between catalyst and hydrocarbon vapors below the discharge opening of the riser while still achieving good separation efficiencies between the catalyst and the hydrocarbon vapors. As depicted in FIG. 3, catalyst again travels up a riser section 62. Catalyst and gaseous components, discharge from outlet 64, travel along flow paths 82 and 84, respectively, until the catalyst and gaseous components separate near the bottom of a catalyst bed 86. Catalyst traveling along flow lines 82 continues its downward path and collects in bed 86. The gaseous components including the hydrocarbon vapors begin an upward path along flow lines 84' and flow upwardly into a downwardly directed inlet opening 88 of a collector 90 in the form of an inverted cup.

FIG. 3 demonstrates the additional contacting time achieved between the catalyst and the gaseous components in the arrangement of this invention. As the catalyst and gaseous components exit the riser through outlet 64, the change in direction concentrates both catalyst and gaseous components towards the outer portion of reactor vessel 76. Relative to the prior art, this allows catalyst and the gaseous components to remain in cocurrent contact over an additional length L as depicted in FIG. 3 and provides more beneficial cocurrent catalyst contacting time within the vessel The additional residence time, or catalyst contacting, obtained within the vessel can be used to increase total residence time or decrease the external length of the reactor riser. This additional residence time is attained without any increased capital expense since the distance L is present in most FCC arrangements and would otherwise go unused.

In accordance with this invention, the reactor operates such that the downwardly directed inlet recovers more than 50% of the gaseous components from the reactor and preferably more than 90% of the gaseous components. A small mount of gaseous components may enter from the top of collector 90 through a small gap provided between riser 62 and collector 90. Gap 91 is provided for structural reasons to allow the riser to expand at a different rate than the collector 90 which is normally supported from the reactor cyclones.

Catalyst and gases withdrawn from the collection device may enter any type of a separation device that will complete the separation of the product gases from the catalyst. Typically, the collection device will pass the catalyst and gaseous mixture to one or more stages of cyclone separators. Whatever separation device is used, it should be of a type that is substantially closed in order to prevent the reentry of gaseous components into the dilute phase of the reactor vessel when cyclone separators are used, it can be either a two-stage cyclone arrangement or a single stage cyclone arrangement as depicted in FIG. 1. The separators will operate in an ordinary manner separating gaseous components from the catalyst and removing gaseous products from the reactor vessel while returning separated catalyst to a stripping zone.

Suitable stripping zones for this invention will be any type that can remove adsorbed hydrocarbons from the catalyst. In most cases, the stripping zone will consist of the usual baffle arrangement as shown in FIG. 1 wherein the catalyst particles are contacted countercurrently to an upward flow of stripping steam. The amount of stripping steam used in this process will be in the usual range, used for FCC operations and will normally vary between 1 to 3 lb of steam per 1000 lb of catalyst.

EXAMPLE

The generally equivalent separation efficiency of the subject invention versus the prior an arrangement for the vented riser was established by a series of catalyst separation tests. The tests were made using a 1.75 inch diameter I.D. riser in an 8 inch vessel to determine the separation efficiency using an upwardly directed opening in a riser cup and a downwardly directed opening in the riser cup. All test runs used an annular inlet area in the cup type collector device that was equal to the riser cross-sectional area. In these runs, the 8 inch vessel had a hemispherical head and the riser outlet terminated at the top tangent line of the reactor vessel. A fixed quantity of FCC catalyst particles were passed through the riser at a selected riser velocity. For each test run the separation efficiency was calculated by dividing the mount of catalyst recovered from the bottom of the reactor vessel from the total mount of catalyst passed through the reactor riser. The difference between these two mounts equals the mount of catalyst entrained with the hydrocarbon vapors collected through the inlet and thereby recovered through the cyclone outlets. Table 1 shows the riser velocities at which the six different runs were carried out and the efficiency of separation achieved after each run. Runs 1, 2 and 3 show the results for the downwardly directed opening of this invention. Relatively high efficiencies were achieved for each of these runs which operated at high riser velocities. As the data demonstrates, the higher riser velocities generally result in lower separation efficiencies. Runs 4, 5 and 6 demonstrate the results for an ordinary vented riser arrangement using an upwardly directed riser opening. Separation efficiencies slightly higher than those achieved in the first series of runs show that both the upwardly directed and downwardly directed inlet openings achieved substantially equivalent separation efficiencies. The equivalency of these efficiencies is particularly evident in view of the generally lower velocities at which the upwardly directed opening runs occurred. Again, the data demonstrates that lower riser velocities generally improved the separation efficiencies and overall the upwardly and downwardly directed riser openings achieved substantially similar results.

TABLE 1

| Plant 240B FCC Modeling | | | | | | |
|---|---|---|---|---|---|---|
| | Downwardly Directed Opening | | | Upwardly Directed Opening | | |
| Run # | 1 | 2 | 3 | 4 | 5 | 6 |
| Length of Test (min) | 3 | 3 | 3 | 3 | 3 | 3 |
| Riser vel., ft/sec | 56.7 | 52.7 | 54.1 | 54.0 | 47.3 | 46.3 |
| Efficiency (%) | 92.8 | 93.5 | 93.3 | 97.8 | 97.8 | 98.0 |

The foregoing description sets forth essential features of this invention which can be adapted to a variety of applications and arrangements without departing from the scope and spirit of the claims hereafter presented.

I claim:

1. An apparatus for the fluidized catalytic cracking (FCC) of an FCC feedstock, said apparatus comprising:
   a) a reactor vessel;
   b) an upwardly directed riser conduit having an upwardly directed discharge opening for discharging gaseous components into the reactor vessel;
   c) means for collecting a gaseous component from said reactor vessel at a locus below said discharge opening, said means for collecting a gaseous component having a downwardly directed inlet opening sized to recover more than 50% of the gaseous components from the riser conduit;
   d) a catalyst separation device communicating with said means for collecting a gaseous mixture for separating catalyst from said gaseous components;
   e) means for removing a gaseous catalyst from said separation device; and
   f) a conduit for removing gaseous components from said separation device and said reactor vessel.

2. The apparatus of claim 1 wherein said upwardly directed discharge opening is located at least midway above the bottom of said reactor vessel.

3. The apparatus of claim 1 wherein said means for collecting a gaseous component comprises an inverted cup located below said discharge opening and said downwardly directed inlet opening comprises an annular opening of said cup that surrounds said riser.

4. The apparatus of claim 3 wherein said catalyst separation device comprises at least one cyclone in closed communication with said inverted cup.

5. The apparatus of claim 4 wherein said cyclones have a dip leg conduit that provides said means for removing catalyst from said separation device and for returning separated catalyst to the bottom of said reactor vessel.

* * * * *